(12) United States Patent
Estepp et al.

(10) Patent No.: US 10,663,087 B2
(45) Date of Patent: May 26, 2020

(54) POWER TOOL CABLE MOUNT

(71) Applicant: Honda Motor Co., Ltd., Tokyo (JP)

(72) Inventors: Ryan Joseph Estepp, Grove City, OH (US); Bryan Christopher Clagett, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/893,995

(22) Filed: Feb. 12, 2018

(65) Prior Publication Data
US 2019/0249801 A1 Aug. 15, 2019

(51) Int. Cl.
*F16L 3/01* (2006.01)
*H02G 11/00* (2006.01)
*F16L 3/11* (2006.01)
*F16L 3/10* (2006.01)

(52) U.S. Cl.
CPC .............. *F16L 3/01* (2013.01); *F16L 3/1091* (2013.01); *F16L 3/11* (2013.01); *H02G 11/003* (2013.01)

(58) Field of Classification Search
CPC ..... F16L 3/01; F16L 3/11; F16L 3/227; F16L 3/22; F16L 3/1091; H02G 11/003
USPC .................. 248/68.1, 62, 67.5, 74.5, 63, 65; 206/443; 176/166 R
See application file for complete search history.

(56) References Cited

U.S. PATENT DOCUMENTS

| | | | | |
|---|---|---|---|---|
| 530,166 A | * | 12/1894 | Dost | B23B 51/101 408/154 |
| 770,278 A | * | 9/1904 | Fletcher | F16L 3/2235 174/155 |
| 2,077,783 A | * | 4/1937 | Taylor | H02G 7/053 248/63 |
| 2,164,022 A | * | 6/1939 | Rowe | H01R 4/46 403/390 |
| 2,473,264 A | | 6/1949 | Stevens et al. | |
| 3,023,989 A | * | 3/1962 | White | F16L 3/2235 174/135 |
| 3,531,071 A | * | 9/1970 | Kubli | F16L 3/2235 248/68.1 |
| 4,131,257 A | * | 12/1978 | Sterling | F16L 3/2235 24/335 |
| 4,706,822 A | * | 11/1987 | Remp, Jr. | B65D 85/20 206/443 |

(Continued)

FOREIGN PATENT DOCUMENTS

| | | | | |
|---|---|---|---|---|
| DE | 2204591 A1 | * | 8/1973 | ............... F16L 3/227 |
| DE | 2334412 A1 | * | 1/1975 | ............... H01R 4/46 |

(Continued)

OTHER PUBLICATIONS

"Multi-Coin Vise" http://www.airgraver.com/Multi-coin-holder.htm (Accessed Nov. 2, 2017).

(Continued)

*Primary Examiner* — Kimberly T Wood
(74) *Attorney, Agent, or Firm* — Honda Patents & Technologies North America, LLC; Morgan K. Lincoln

(57) ABSTRACT

A hanging cable mount includes a first body portion, a second body portion, and a fastener. The first body portion has a first channel defined in a first surface and a second channel having a different shape defined in a second surface. The second body portion has a third channel defined in a third surface and a fourth channel having a different shape defined in a fourth surface, each channel coinciding with the first channel and the third channel, respectively, to jointly clamp a cable. The fastener is configured to removably couple the first body portion to the second body portion.

20 Claims, 10 Drawing Sheets

(56) References Cited

U.S. PATENT DOCUMENTS

| | | | | |
|---|---|---|---|---|
| 5,123,547 A * | 6/1992 | Koch | .................... | F16L 3/2235 |
| | | | | 211/59.4 |
| 5,377,939 A * | 1/1995 | Kirma | .................... | F16B 7/048 |
| | | | | 24/543 |
| 5,474,274 A * | 12/1995 | Bernosky | ................ | E21F 17/02 |
| | | | | 248/317 |
| 6,454,232 B1 | 9/2002 | Roth | | |
| 6,467,811 B2 * | 10/2002 | Mitchell | ............... | F16L 23/003 |
| | | | | 285/114 |
| 9,000,299 B2 * | 4/2015 | Ruth | ........................ | H02G 3/32 |
| | | | | 174/40 CC |
| 9,266,478 B2 | 2/2016 | Patel | | |
| 2006/0289577 A1 | 12/2006 | Malone | | |
| 2018/0023757 A1 * | 1/2018 | Baiera | .................... | E04H 12/22 |
| | | | | 248/513 |

FOREIGN PATENT DOCUMENTS

| | | | | |
|---|---|---|---|---|
| DE | 3045520 A1 * | 6/1982 | ............. | B66C 13/12 |
| GB | 335221 A | 9/1930 | | |
| GB | 486959 A | 6/1938 | | |
| GB | 544618 A * | 4/1942 | .............. | F16L 3/227 |
| GB | 558942 A * | 1/1944 | ............ | F16L 3/1091 |
| GB | 1322771 A * | 7/1973 | ................ | F16B 7/04 |
| GB | 2182302 A * | 5/1987 | ............. | E21F 17/06 |
| JP | S5840724 Y2 | 9/1989 | | |
| WO | WO-2013134824 A1 * | 9/2013 | ............. | B66C 13/12 |

OTHER PUBLICATIONS

"O-Z/Gedney™ Ground Clamps" http://www.emerson.com/en-us/catalog/o-zgedney-ground-clamps-ozg (Accessed Nov. 2, 2017).
"Grounding Rod to Cable Clamp" http://www.globalsources.com/si/AS/Chengdu-Sunlight/6008825718003/pdtl/Grounding-Rod-to-cable-clamp/1083477296.htm (Accessed Nov. 2, 2017).
"Ground Clamp" http://www.modd3d.com/articles/item/rooftop-flying-crank-ghost-part-1 (Accessed Nov. 2, 2017).
"Universal Pipe Clamp" http://www.rigwheels.com/product/universal-pipe-clamp (Accessed Nov. 2, 2017).

* cited by examiner

POWER TOOL CABLE MOUNT

BACKGROUND

In a manufacturing environment, a manufacturing associate is often provided with a powered hand tool near a work space to assist in performing certain tasks, such as installing a fastener or verifying a torque specification. This tool may be powered by either a remote power source through a power cable, or by a tool-mounted battery pack. The tool often also includes a data transfer cable to export data, such as a torque measurement, to a database.

If the tool requires a power cable and/or a data transfer cable, a cable routing system may be used to allow the tool to remain mobile while preventing the cable from interfering with other objects in the vicinity. The cable routing system may include a trolley configured to move along an overhead sliding rail.

In known systems, the cable is fastened to the trolley using known disposable cable tie fasteners. This fastening mechanism presents issues if the cable tie is installed too tightly onto the cable, by increasing pressure on the outer surface of the cable and creating a potential for pre-mature failure. Also, if the cable tie is installed too loosely and fails to adequately secure the cable from sliding relative to a trolley, the outer surface of the cable may experience increased wear, and also the cable's movement may become unpredictable and increase a risk of the cable becoming snagged or pinched by nearby objects.

Alternatively, known hanging clamps include a profile configured to apply uniform pressure to the outer surface of a cable in order to securely attach the cable to a rail system trolley while minimizing wear. However, these clamps are individually only compatible with cables having a specific shape, limiting their versatility within a manufacturing environment since manufacturing operations generally utilize a variety of cables having different shapes and sizes. It is also more efficient and economical to keep in inventory as few spare parts as possible for cost and inventory management purposes, thus creating a need for more versatile cable clamps that can be utilized over a broad range of cable shapes and sizes.

BRIEF SUMMARY

According to one aspect, a hanging cable mount includes a first body portion, a second body portion, and a fastener. The first body portion has a first channel defined in a first surface and a second channel having a different shape defined in a second surface. The second body portion has a third channel defined in a third surface and a fourth channel having a different shape defined in a fourth surface, each channel coinciding with the first channel and the third channel, respectively, to jointly clamp a cable. The fastener is configured to removably couple the first body portion to the second body portion.

According to another aspect, a hanging cable mount system includes a hanging cable mount, an overhead rail, a carrier trolley, and a coupling device. The hanging cable mount has a first body portion and a second body portion, wherein the first body portion comprises a first surface having a first channel defined therein, and a second surface opposite the first surface having a second channel defined therein; the second body portion comprises a third surface having a third channel defined therein and a fourth surface opposite the third surface having a fourth channel defined therein. When the first surface is positioned adjacent the third surface, the first channel and the third channel combine to form a substantially circular opening through the hanging cable mount. When the second surface is positioned adjacent the fourth surface, the second channel and the fourth channel combine to form a substantially rectangular opening through the hanging cable mount. The hanging cable mount also includes a fastener configured to removable couple the first body portion to the second body portion. The carrier trolley is coupled to and configured to slide along the overhead rail. The coupling device is configured to attach the hanging cable mount to the carrier trolley.

According to a further aspect, a cable holder element comprises a first surface and a second surface. The first surface includes a first channel defined therein, wherein the first channel has a substantially semi-circular cross section and extends from a first holder end to a second holder end of the holder element. The second surface is opposite the first surface and includes a second channel defined therein, wherein the second channel has a substantially rectangular cross section and extends from the first holder end to the second holder end.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

With reference now to the figures wherein the illustrations are for purposes of illustrating one or more exemplary embodiments and not for purposes of limiting the same, there is shown a power tool cable mount.

Drawings

Figure 1:
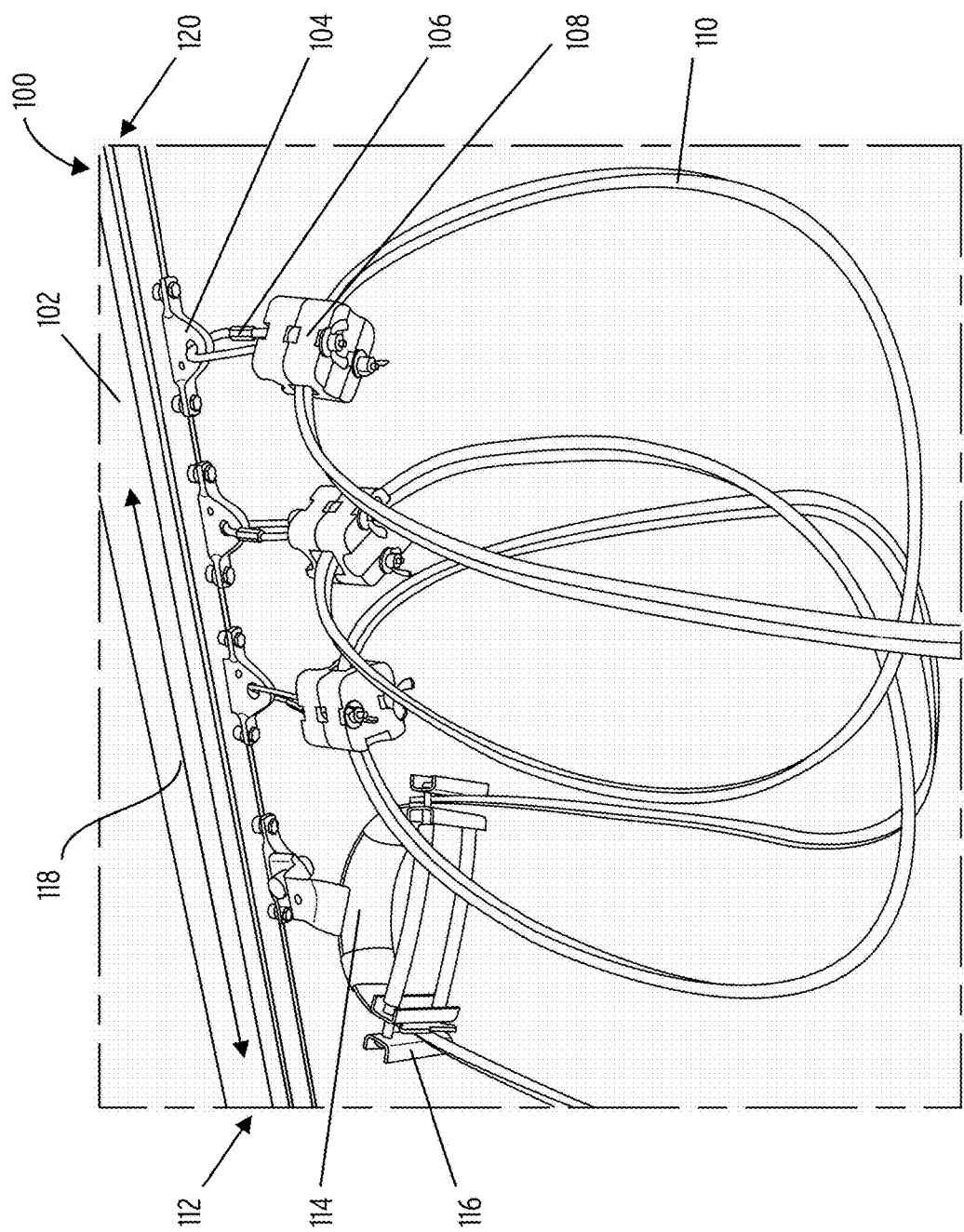
FIG. 1 is a perspective view of a hanging cable mount system.

FIG. 1 is a perspective view of a hanging cable mount system 100. The hanging cable mount system 100 includes an overhead rail 102, a carrier trolley 104, a coupling device 106, and a hanging cable mount 108. The overhead rail 102 extends in a longitudinal direction along a longitudinal rail axis 118 and begins at a first rail end 112 and terminates at a second rail end 120. The carrier trolley 104 is mounted to the overhead rail 102 and configured to slide along the longitudinal rail axis 118. In the depicted embodiment the hanging cable mount system 100 includes an individual carrier trolley 104 and coupling device 106 for each hanging cable mount 108 present in the hanging cable mount system 100, however in other embodiments multiple hanging cable mounts 108 may be coupled to a single carrier trolley 104. The coupling device 106 attaches to the carrier trolley 104, and the hanging cable mount 108 attaches to the coupling device 106. In an alternative embodiment, the hanging cable mount 108 may be mounted directly to the overhead rail 102 in a non-sliding configuration (i.e., in a fixed position along the overhead rail 102).

In the exemplary embodiment, the hanging cable mount 108 is configured to hold a portion of a cable 110 in an overhead position (e.g., above the head of a tool operator and/or over an area where work is being performed). The cable 110 is coupled to a stationary object (e.g., computer system, power source)(not shown) at one end, and coupled to a powered hand tool (e.g., torque wrench, powered ratchet)(not shown) at another end. The hanging cable mount 108 is coupled to the overhead rail 102 and configured to allow movement of the cable 110 along the longitudinal rail axis 118. Although the depicted embodiment includes four hanging cable mounts 108, other embodiments can include any other number of hanging cable mounts 108 as needed to support the cable 110 in a specific application. The cable 110 in the depicted embodiment is a single cable 110 coupled to multiple hanging cable mounts 108 in a looped configuration, wherein extra slack in the cable 110 as it hangs below the overhead rail 102 is looped between the individual hanging cable mounts 108 to prevent tangling. The hanging cable mount system 100 and supported cable 110 may be positioned either partially or completely above the head of the tool operator.

As shown in FIG. 1, the cable 110 has a substantially flat cross section that may comprise two or more round wires bundled together adjacent one another within a single cable covering. However, the cable 110 in alternative embodiments may have a substantially round cross section comprising a single wire or a bundle of wires interwoven together within a single cable covering.

The depicted embodiment also includes a fixed cable carrier 114 at the first rail end 112. The fixed cable carrier 114 is mounted to the overhead rail 102 in a non-sliding configuration. The fixed cable carrier 114 may also include a cable clamp 116 to secure and prevent the cable 110 from sliding relative to the fixed cable carrier 114. In an alternative embodiment, the fixed cable carrier 114 may be adjustably mounted to the overhead rail 102 to allow for adjustment of its fixed position along the longitudinal rail axis 118. The fixed cable carrier 114 secures the cable 110 in a stationary position at the first rail end 112 as the hanging cable mounts 108 slide along the longitudinal rail axis 118. The fixed cable carrier 114 may be positioned near the stationary object to which an end of the cable 110 is coupled to prevent movement of the cable 110 from translating to the object and causing excess strain to the object and/or a connection point between the cable 110 and the object.

Figure 2:
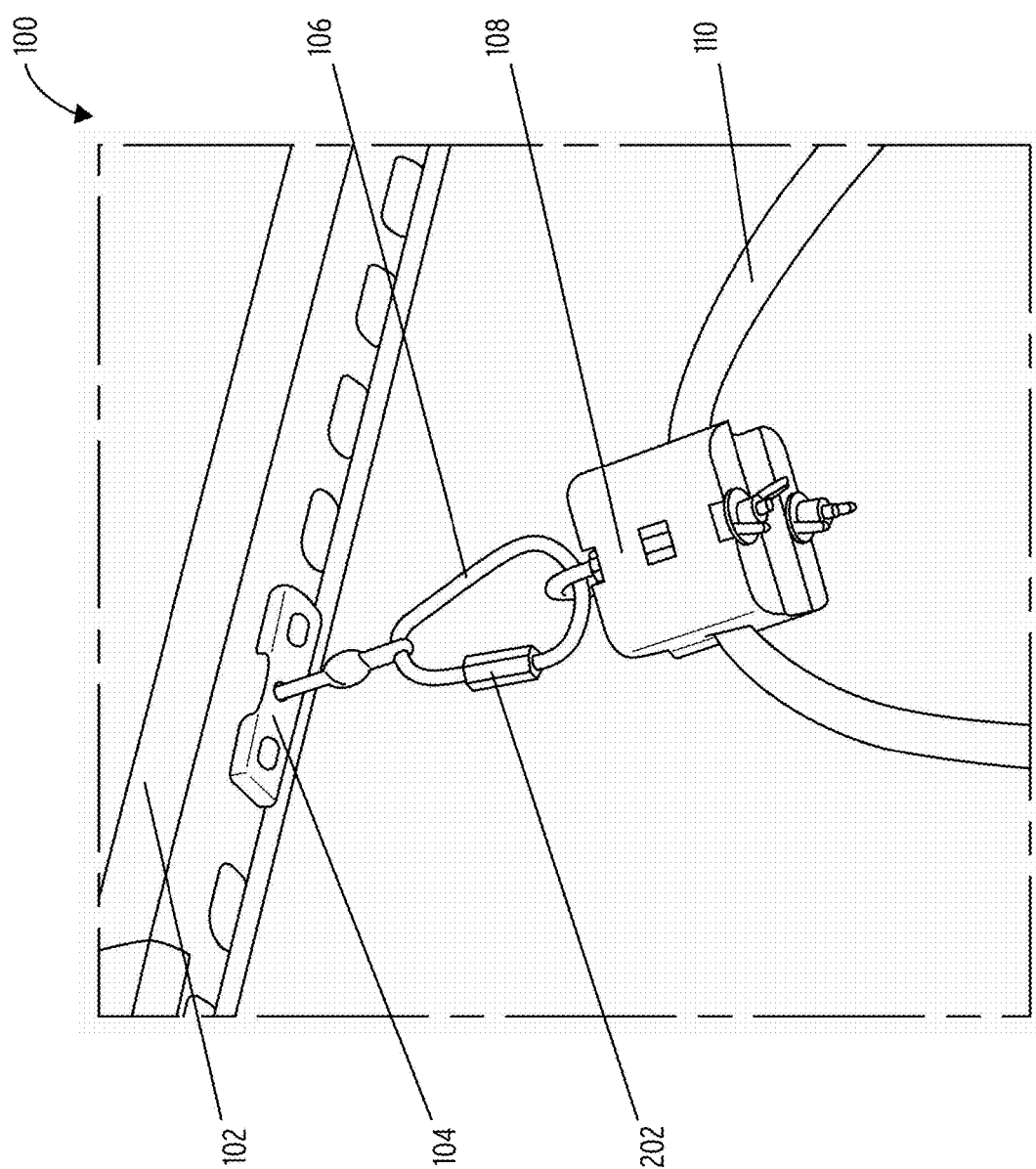
FIG. 2 is a perspective view of a hanging cable mount coupled to an overhead rail.

FIG. 2 is a perspective view of the hanging cable mount 108 coupled to an overhead rail 102. A carrier trolley 104 is slidingly mounted to the overhead rail 102. A coupling device 106 is attached to the carrier trolley 104 at one end, and the hanging cable mount 108 at an opposite end. The coupling device 106 may comprise an s-hook, a carabiner, or any other attachment mechanism capable of coupling two looped structures in a swinging configuration. The coupling device 106 shown in FIG. 1 and FIG. 2 is a carabiner that includes a locking mechanism 202. Additionally, the cable 110 has a substantially round cross-section in the alternative embodiment depicted in FIG. 2.

Figure 3:
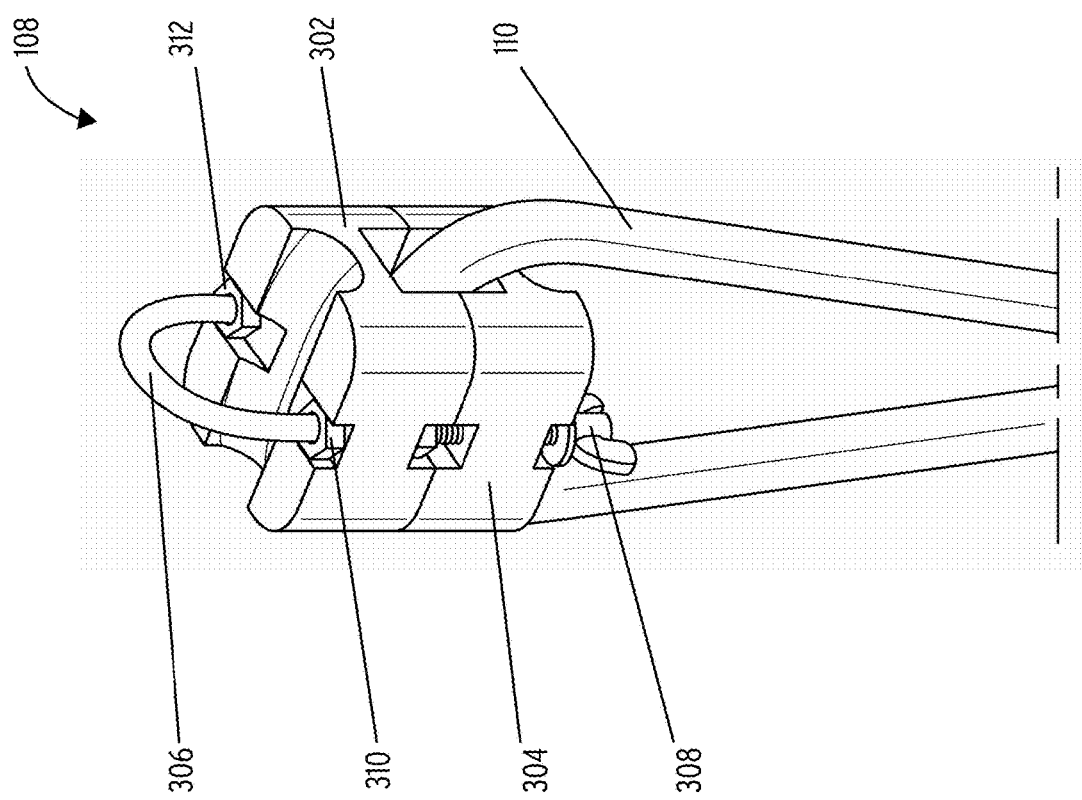
FIG. 3 is a perspective view of the hanging cable mount shown in FIG. 2 securing a cable.

FIG. 3 is a perspective view of the hanging cable mount 108 securing a cable 110. The cable 110 in the depicted embodiment may be referred to as a flat cable, comprising two or more round wires coupled together adjacent one another within a covering of the cable. The hanging cable mount 108 comprises a first body portion 302, a second body portion 304, a u-bolt 306, a third nut 308, and a second nut (not shown). The first body portion 302 and second body portion 304 are positioned adjacent one another. The u-bolt 306 is inserted through both the first body portion 302 and the second body portion 304, and the third nut 308 and the second nut (not shown) are each screwed onto a respective leg of the u-bolt 306 adjacent the second body portion 304. The cable 110 is positioned between the first body portion 302 and the second body portion 304 and secured by a clamping force applied to the cable 110 as the third nut 308 and second nut are tightened onto the u-bolt 306 and against the second body portion 304. The hanging cable mount 108 may also include a first nut 310 and a second nut 312 each threaded onto a respective leg of the u-bolt 306 and positioned adjacent the first body portion 302.

Figure 4:
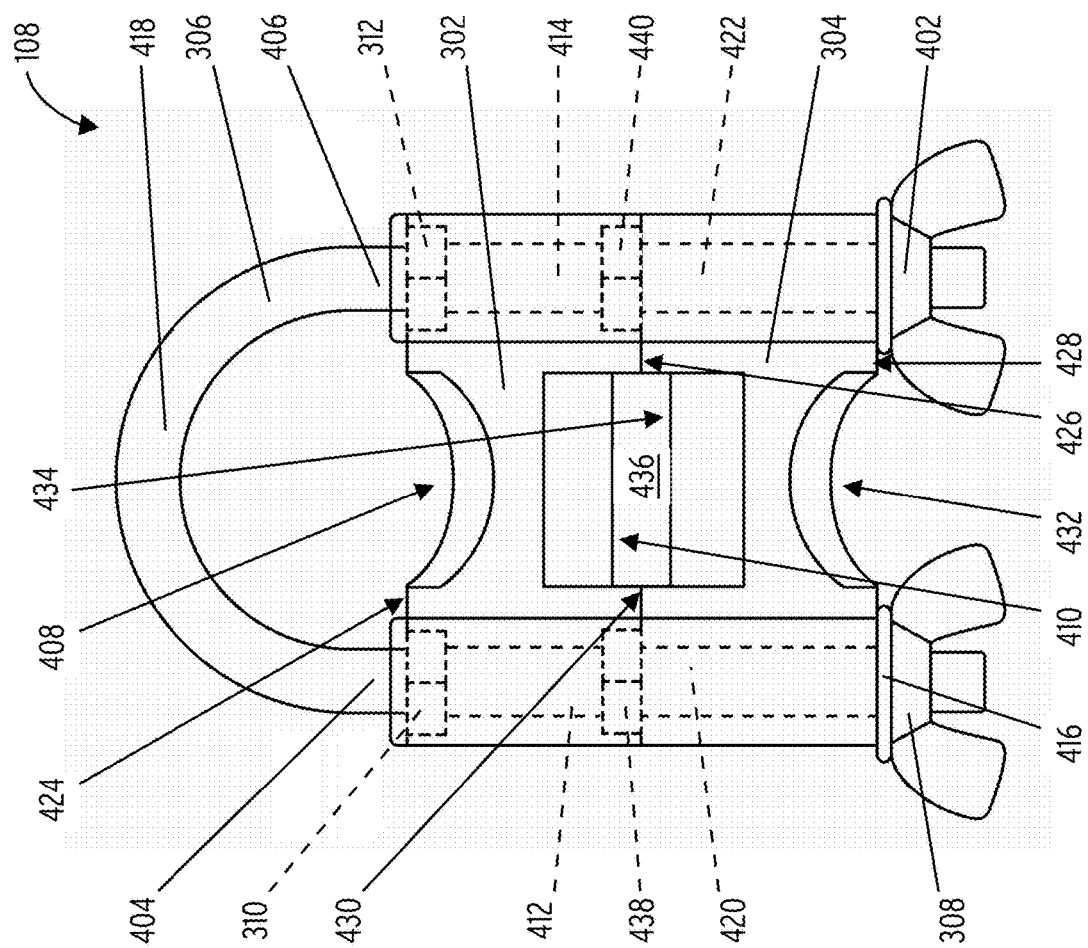
FIG. 4 is a side view of the hanging cable mount shown in FIG. 2.

FIG. 4 is a side view of the hanging cable mount 108. The u-bolt 306 comprises a first leg 404, a second leg 406, and a loop section 418. The first leg is threaded and configured to receive the third nut 308 and the second leg 406 is threaded and configured to receive the fourth nut 402. The loop section 418 terminates at one end of the first leg 404 and one end of the second leg 406, and is configured to attach to the coupling device 106.

The hanging cable mount 108 includes a first body portion outside surface 424 and a first body portion inside surface 426. In the depicted configuration wherein the hanging cable mount 108 is configured to secure a flat cable, the first body portion outside surface 424 corresponds with a first surface of the first body portion 302 and includes a first channel 408 defined therein; the first body portion inside surface 426 corresponds with a second surface of the first body portion 302 and includes a second channel 410 defined therein. It is understood that the first surface and second surface are defined by their respective first channel 408 and second channel 410, and not by the orientation of the surface relative to the hanging cable mount 108. In an alternative configuration wherein the hanging cable mount 108 is configured to secure a round cable, the first body portion 302 and second body portion 304 would each turn upside down with respect to their current positions, and the first surface would then correspond with the first body portion inside surface 426 and the second surface would correspond with the first body portion outside surface 424.

The top holder includes a first opening 412 and a second opening 414 defined therein, each through-hole 412, 414 extending between the first surface and the second surface. The first opening 412 is configured to receive the first leg 404, and the second opening 414 is configured to receive the second leg 406 of the u-bolt 306.

The hanging cable mount 108 also includes a second body portion outside surface 428 and a second body portion inside surface 430. In the depicted configuration wherein the hanging cable mount 108 is configured to secure a flat cable, the second body portion outside surface 428 corresponds with a third surface of the second body portion 304 and includes a third channel 432 defined therein; the second body portion inside surface 430 corresponds with a fourth surface of the second body portion 304 and includes a fourth channel 434 defined therein. Similar to the first body portion 302, the third surface and fourth surface are defined by their respective third channel 432 and fourth channel 434, and not by the orientation of the surface relative to the hanging cable mount 108. The second body portion 304 includes a third opening 420 and a fourth opening 422 defined therein, each extending between the third surface and the fourth surface. The third opening is configured to receive the first leg 404, and the fourth opening is configured to receive the second leg 406 of the u-bolt 306.

In the depicted embodiment, the hanging cable mount 108 is configured with the second channel 410 and the fourth channel 434 adjacent one another, defining a substantially rectangular opening 436 to secure a flat cable. In an alternative configuration, the first channel 408 and the third channel 432 may be positioned adjacent one another to define a substantially circular opening (not shown) to secure a round cable.

As previously described, the third nut 308 is threaded onto the first leg 404 of the u-bolt 306, and the fourth nut 402 is similarly threaded onto the second leg 406 of the u-bolt 306. The third nut 308 and fourth nut 402 are each positioned adjacent the second body portion outside surface 428. The third nut 308 and the fourth nut 402 may comprise a wingnut, a hex nut, or any other fastener capable of coupling to the first leg 404 and second leg 406 of the u-bolt 306. A washer 416 may also be included between each of the third nut 308 and fourth nut 402 and the second body portion outside surface 428. If a cable 110 is present between the first body portion inside surface 426 and the second body portion inside surface 430, as shown in FIG. 3, the third nut 308 and fourth nut 402 may be tightened against the second body portion outside surface 428 to create pressure against an outer surface of the cable by the first body portion inside surface 426 and the second body portion inside surface 430 to secure the cable 110 therein.

The hanging cable mount 108 may also contain a first intermediate nut 438 and a second intermediate nut 440 positioned adjacent the first body portion inside surface 426. The first intermediate nut 438 is threaded onto the first leg 404 of the u-bolt 306 and tightened against the first body portion inside surface 426, and the second intermediate nut 440 is threaded onto the second leg 406 of the u-bolt 306 and also tightened against the first body portion inside surface 426. The first intermediate nut 438 and second intermediate nut 440 retain the first body portion 302 onto the u-bolt 306 when the second body portion 304 is removed, such as when removing the cable 110.

Figure 5:
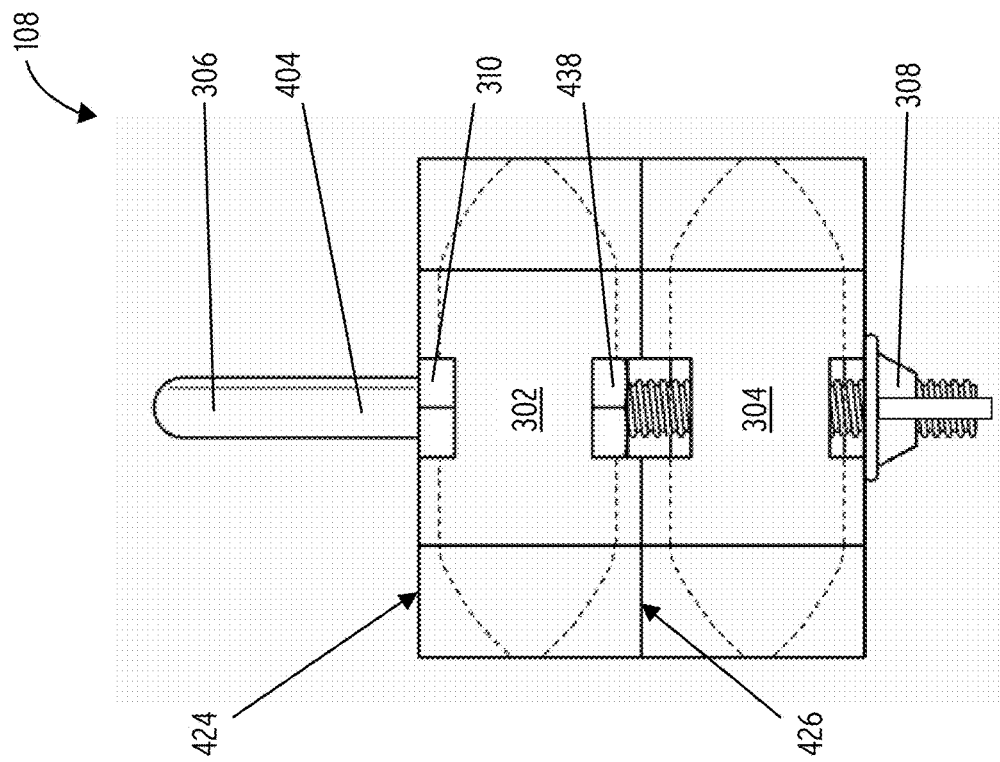
FIG. 5 is a front view of the hanging cable mount shown in FIG. 2.

FIG. 5 is a front view of the hanging cable mount 108. As previously described, the hanging cable mount 108 may include a first nut 310 and a second nut 312. The first nut 310 is threaded onto the first leg 404 of the u-bolt 306 and positioned adjacent the first body portion outside surface 424, and the second nut 312 is threaded onto the second leg 406 of the u-bolt 306 and also positioned adjacent the first body portion outside surface 424. The first nut 310 and second nut 312 prevent the first body portion 302 from shifting towards the loop section 418 as the third nut 308 and the fourth nut 402 are tightened against the second body portion outside surface 428.

Figure 6:
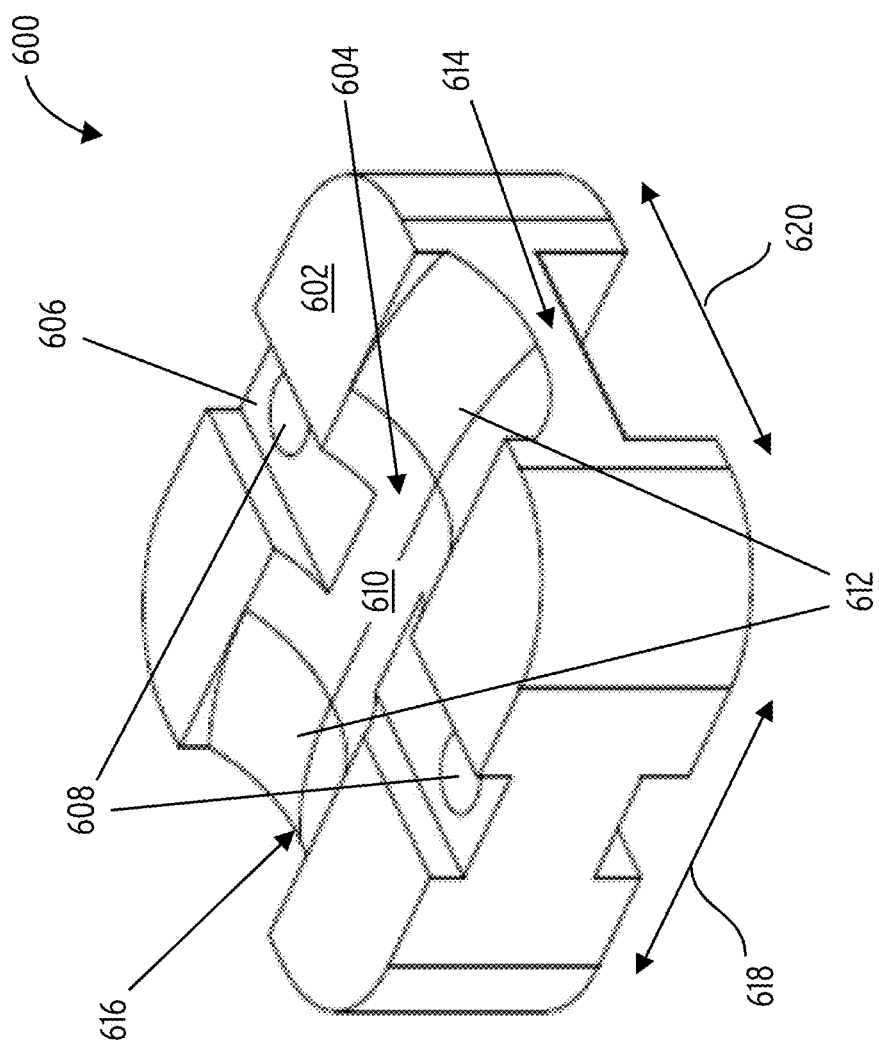
FIG. 6 is a perspective view of a cable holder element oriented with a first surface on top.

FIG. 6 is a perspective view of a cable holder element 600. The holder element 600 may be used as the first body portion 302 and the second body portion 304 of the hanging cable mount 108 shown in FIG. 3. The holder element 600 comprises a first surface 602 and a second surface (not shown), and is oriented in FIG. 6 such that the first surface 602 is positioned on top. The first surface 602 includes a first channel 604 defined therein having a substantially semi-circular cross section oriented in a longitudinal direction along a longitudinal element axis 618, and extends from a first holder end 614 to a second holder end 616 of the holder element 600. The first channel 604 has a first channel center section 610 wherein it has no curvature along the longitudinal element axis 618. The first channel 604 is convexly shaped at two end sections 612 that terminate at the first channel center section 610 at one end and either the first holder end 614 or the second holder end 616 at a second end.

The holder element 600 also includes an opening 608 defined therein that extends from the first surface 602 to the second surface. As shown in FIG. 6, the holder element 600 may include two or more openings 608. The opening 608 may be positioned within a first notch 606 that is defined in a lateral direction along a lateral element axis 620 that is perpendicular to the direction of the first channel 604, and extends from one end of the holder element 600 to an opposite end. The first notch 606 is configured to receive a fastener, such as a nut, and to allow the fastener to remain recessed with respect to the first surface 602 so the first surface 602 of the holder element 600 may be positioned flush against an adjacent surface, such as a first surface of another holder element.

Figure 7:
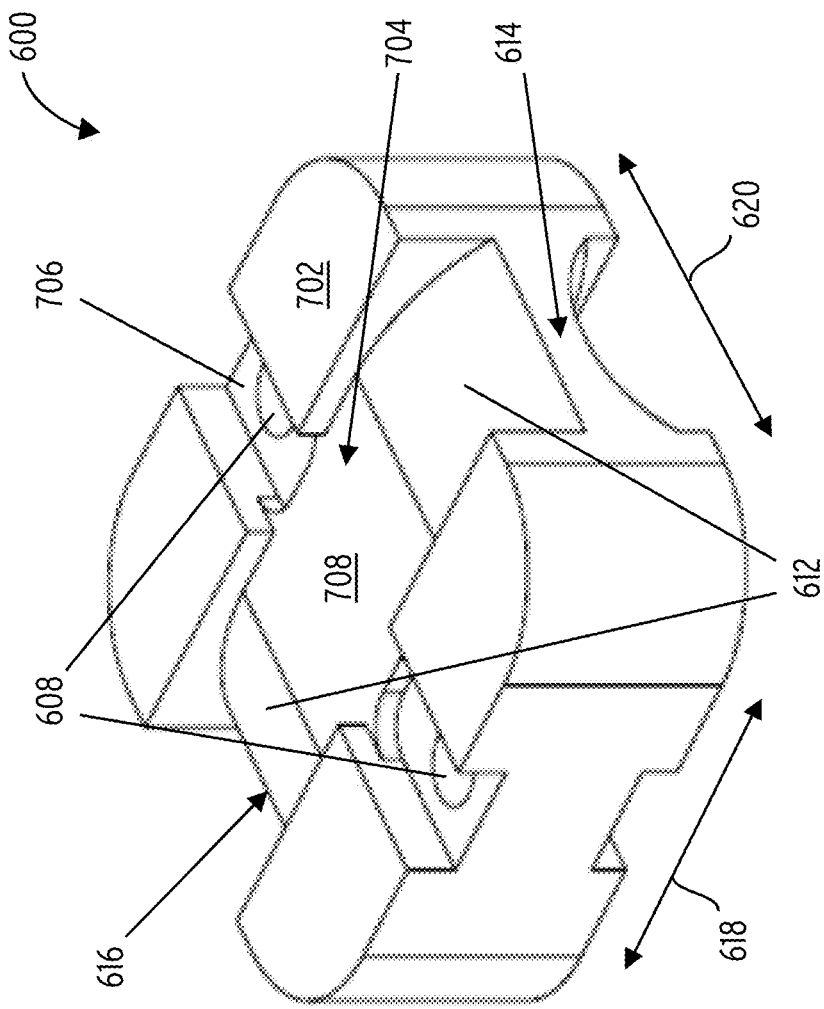
FIG. 7 is a perspective view of the cable holder element shown in FIG. 6, oriented with a second surface on top.

FIG. 7 is a perspective view of the cable holder element 600 oriented with the second surface 702 positioned on top. The second surface 702 includes a second channel 704 having a substantially rectangular cross section that is defined in the longitudinal direction along the longitudinal element axis 618 and extends from the first holder end 614 to the second holder end 616. The second channel 704 has a second channel center section 708 wherein it has no curvature along the longitudinal element axis 618. The second channel 704 is convexly shaped at two end sections 612 that terminate at the second channel center section 708 at one end and either the first holder end 614 or the second holder end 616 at a second end.

Similar to the first surface 602, the second surface 702 may include a second notch 706 defined in the lateral direction along the lateral element axis 620 that is perpendicular to the direction of the second channel 704, and extends from one end of the holder element 600 to an opposite end. The second notch 706 is also similarly configured to receive a fastener and to allow the fastener to remain recessed with respect to the second surface 702.

The first channel center section 610 and second channel center section 708 are the primary regions of the first body portion inside surface 426 and second body portion inside surface 430 that apply pressure to the outer surface of the cable 110. The convex shape of the end sections 612 allows a gradual decrease of pressure against the cable 110 as it exits the holder element 600, to help reduce premature wear.

Figure 8:
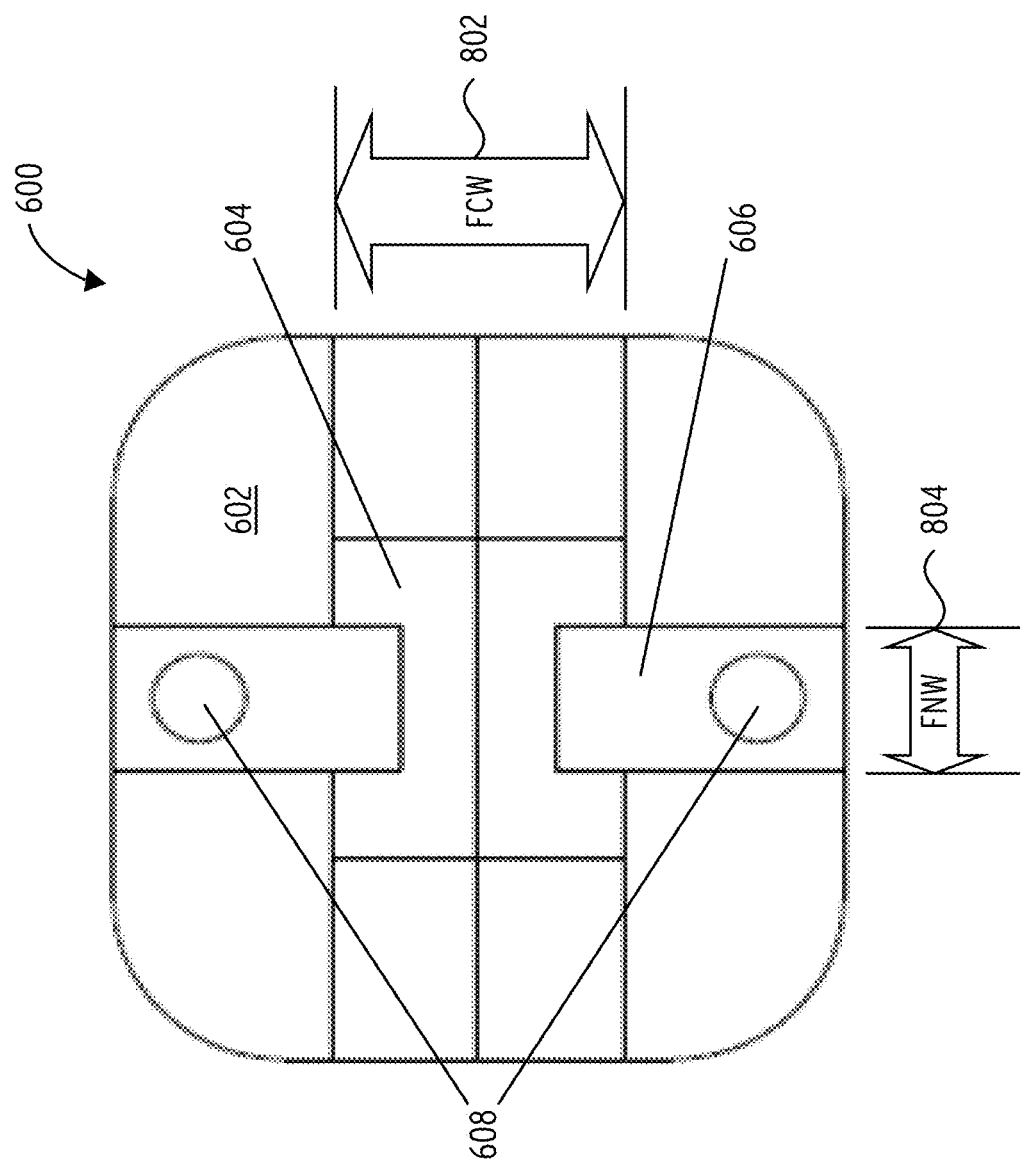
FIG. 8 is a top view of the cable holder element shown in FIG. 6.

FIG. 8 is a top view of the cable holder element 600 wherein the first surface 602 is shown. A first channel width (FCW 802) is 0.85" in the exemplary embodiment, however FCW 802 can range from 0.50-1.00" in other embodiments to accommodate round cables having different diameters. A first notch width (FNW 804) is 0.45" in the depicted embodiment, however FNW 804 can vary between 0.25-1.00" in other embodiments to allow the first notch 606 to receive a fastener having a different size. A second notch width (SNW) (not shown), is defined similar to FNW 804, however SNW can vary within the given range independent of FNW 804.

Figure 9:
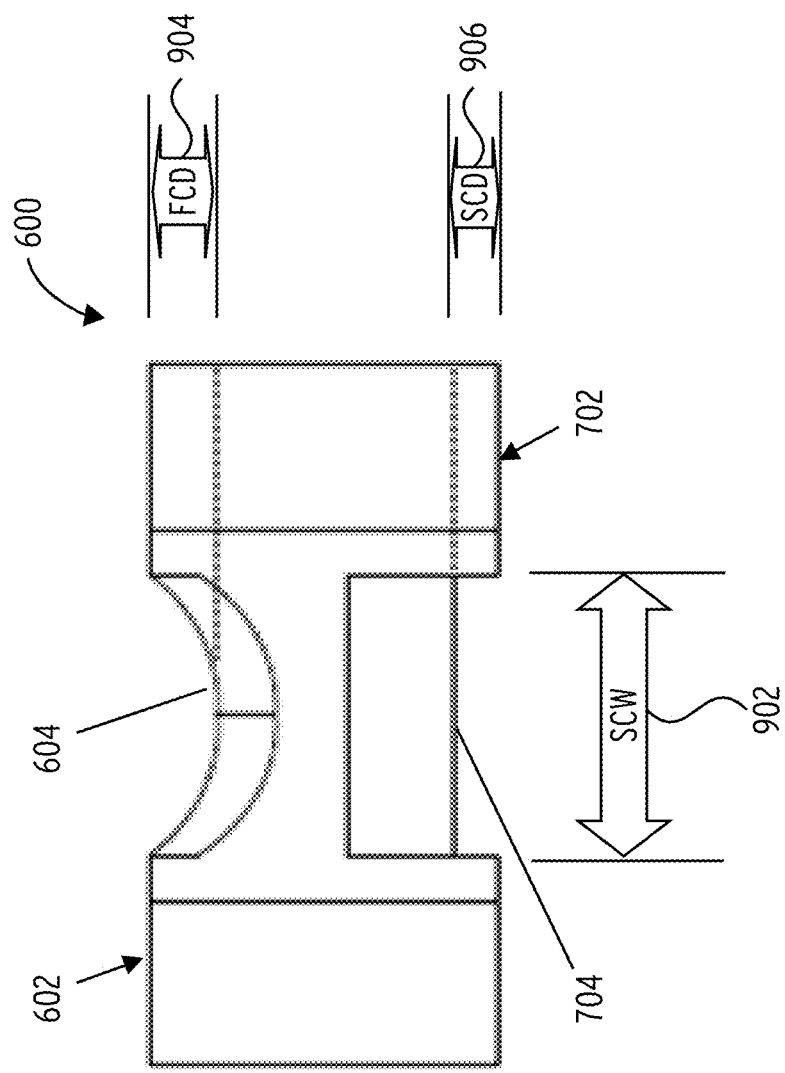
FIG. 9 is a side view of the cable holder element shown in FIG. 6.

FIG. 9 is a side view of the cable holder element 600. A second channel width (SCW 902) is 0.85" in the depicted embodiment, however SCW 902 can range from 0.50-1.00" in other embodiments to accommodate flat cables having different sized cross-sections. Although FCW 802 and the SCW 902 are identical in the depicted embodiment, they can each vary independently as needed, such as to accommodate a specific mix of cables used in a particular manufacturing environment.

In the depicted embodiment, a first channel depth (FCD 904) is 0.20" at the first channel center section 610, and a second channel depth (SCD 906) is 0.13" at the second channel center section 708. FCD 904 and SCD 906 can each range from 0.05-0.30" in other embodiments to accommodate cables having different sized cross-sections.

Figure 10:
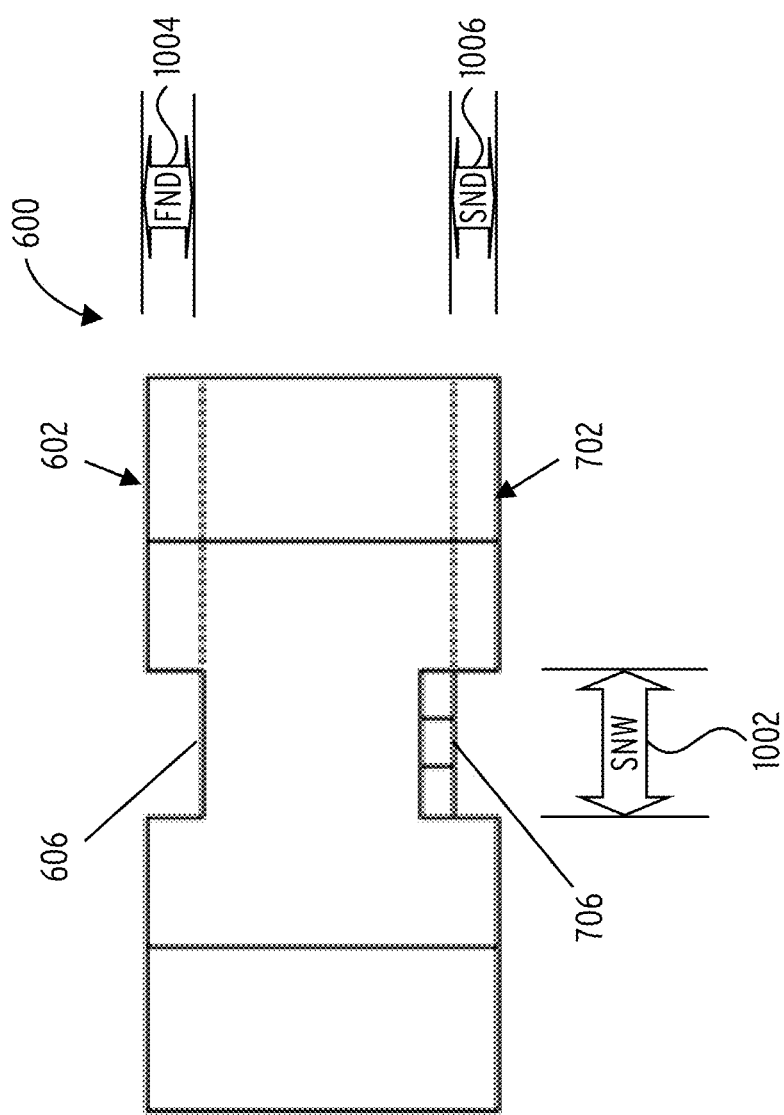
FIG. 10 is a front view of the cable holder element shown in FIG. 6.

FIG. 10 is a front view of the cable holder element 600. A first notch depth (FND 1004) and a second notch depth (SND 1006) are 0.16" in the disclosed embodiment, however FND 1004 and SND 1006 can vary from 0.10-0.50" in other embodiments to accommodate different sized fasteners. Also, FND 1004 and SND 1006 can each vary independently to accommodate the use of different sized fasteners on each of the first surface 602 and the second surface 702, respectively.

The foregoing detailed description of exemplary embodiments is included for illustrative purposes only. It should be understood that other embodiments could be used, or modifications and additions could be made to the described embodiments. Therefore, the disclosure is not limited to the embodiments shown, but rather should be construed in breadth and scope in accordance with the recitations of the appended claims.

What is claimed is:

1. A hanging cable mount consisting of a first body portion, a second body portion, a fastener, a plurality of nuts, and a plurality of washers, wherein:
   the first body portion has a first channel defined in a first surface and a second channel having a different shape defined in a second surface, a first opening and a second opening each extending from the first surface to the second surface, and a notch defined on each of the first surface and the second surface in a direction perpendicular to the direction of the first channel and the second channel, respectively, and extending from one end of the holder element to an opposite end;
   the second body portion has a third channel defined in a third surface and a fourth channel having a different shape defined in a fourth surface, a third opening and a fourth opening each extending from the third surface to the fourth surface, a notch defined on each of the third surface and the fourth surface in a direction perpendicular to the direction of the third channel and the fourth channel, respectively, and extending from one end of the holder element to an opposite end, and wherein each channel coincides with the first channel and the third channel, respectively, to jointly clamp a cable; and
   the fastener is configured to removably couple the first body portion to the second body portion;
   the plurality of nuts is configured to removably couple to the fastener;
   the first body portion is identical to the second body portion;
   each of the first body portion and the second body portion is reversible such that the first surface may be positioned adjacent the third surface and the second surface may be positioned adjacent the fourth surface;
   each of the first channel, second channel, third channel, and fourth channel include a center section and two end sections; and
   each of the first channel, second channel, third channel, and fourth channel is flat at the center section and convexly shaped at the two end sections.

2. The hanging cable mount of claim 1, wherein:
   when the first surface is positioned adjacent the third surface, the first channel and the third channel combine to form a substantially circular opening through the cable mount; and when the second surface is positioned adjacent the fourth surface, the second channel and the fourth channel combine to form a substantially rectangular opening through the hanging cable mount;
   the first channel and the third channel are each convexly shaped in a longitudinal direction so as a height and width of the circular opening at a first holder end and a second holder end is greater than a height and width at the center section, and the center section has a fixed height and width along the longitudinal direction;
   the second channel and the fourth channel are each convexly shaped in a longitudinal direction so as a height and width of the rectangular opening at a first holder end and a second holder end is greater than a height and width at the center section, and the center section has a fixed height and width along the longitudinal direction;
   the first opening is substantially aligned with the third opening and the second opening is substantially aligned with the fourth opening when the first body portion is coupled to the second body portion;
   the fastener comprises a first leg configured to extend through the first opening and the third opening; a second leg configured to extend through the second opening and the fourth opening; and a loop section terminating at the first leg at one end and the second leg at another end;
   the plurality of nuts comprises a first nut attached to the first leg adjacent a first body portion outside surface; a second nut attached to the second leg adjacent the first body portion outside surface; a first intermediate nut attached to the first leg adjacent a first body portion inside surface; a second intermediate nut attached to the second leg adjacent the first body portion inside surface; and
   the first nut, the second nut, the first intermediate nut, and the second intermediate nut each comprise a hex nut.

3. The hanging cable mount of claim 1, wherein when the first surface is positioned adjacent the third surface, the first channel and the third channel combine to form a substantially circular opening through the cable mount; and when the second surface is positioned adjacent the fourth surface, the second channel and the fourth channel combine to form a substantially rectangular opening through the hanging cable mount.

4. The hanging cable mount of claim 3, wherein the first channel and the third channel are each convexly shaped in a longitudinal direction so as a height and width of the circular opening at a first holder end and a second holder end is greater than a height and width at the center section, and the center section has a fixed height and width along the longitudinal direction.

5. The hanging cable mount of claim 3, wherein the second channel and the fourth channel are each convexly shaped in a longitudinal direction so as a height and width of the rectangular opening at a first holder end and a second holder end is greater than a height and width at the center section, and the center section has a fixed height and width along the longitudinal direction.

6. The hanging cable mount of claim 1, wherein the first opening is substantially aligned with the third opening and the second opening is substantially aligned with the fourth opening when the first body portion is coupled to the second body portion.

7. The hanging cable mount of claim 6, wherein the fastener comprises:
   a first leg configured to extend through the first opening and the third opening;
   a second leg configured to extend through the second opening and the fourth opening; and
   a loop section terminating at the first leg at one end and the second leg at another end.

8. The hanging cable mount of claim 7, wherein the plurality of nuts comprises:
   a first nut attached to the first leg adjacent a first body portion outside surface; and
   a second nut attached to the second leg adjacent the first body portion outside surface.

9. The hanging cable mount of claim 8, wherein the plurality of nuts further comprises:
   a third nut attached to the first leg adjacent a second body portion outside surface; and
   a fourth nut attached to the second leg adjacent the second body portion outside surface.

10. The hanging cable mount of claim 8, wherein the plurality of nuts further comprises:
    a first intermediate nut attached to the first leg adjacent a first body portion inside surface; and
    a second intermediate nut attached to the second leg adjacent the first body portion inside surface.

11. The hanging cable mount of claim 10, wherein the first nut, the second nut, the first intermediate nut, and the second intermediate nut each comprise a hex nut.

12. A hanging cable mount system that includes:
    a hanging cable mount consisting of a first body portion, a second body portion, a fastener, a plurality of nuts, and plurality of washers, wherein:
      the first body portion is reversible and comprises a first surface having a first channel defined therein, and a second surface opposite the first surface having a second channel defined therein;
      the second body portion is reversible and comprises a third surface having a third channel defined therein and a fourth surface opposite the third surface having a fourth channel defined;
      the first body portion is identical to the second body portion;
      each of the first channel, second channel, third channel, and fourth channel include a center section and two end sections;
      each of the first channel, second channel, third channel, and fourth channel is flat at the center section and convexly shaped at the two end sections;
      when the first surface is positioned adjacent the third surface, the first channel and the third channel combine to form a substantially circular opening through the hanging cable mount; and
      when the second surface is positioned adjacent the fourth surface, the second channel and the fourth channel combine to form a substantially rectangular opening through the hanging cable mount;
      a first opening and a second opening extend from a first body portion outside surface to a second body portion outside surface; and
      the fastener is configured to removably couple the first body portion to the second body portion;
    an overhead rail;
    a carrier trolley coupled to and configured to slide along the overhead rail; and
    a coupling device configured to attach the hanging cable mount to the carrier trolley.

13. The hanging cable mount system of claim 12, wherein:
    the fastener comprises a u-bolt that is configured to extend through each of the first opening and the second opening; and
    the plurality of nuts comprises a nut attached to each of a first leg and a second leg of the u-bolt adjacent the second body portion outside surface.

14. The hanging cable mount system of claim 12, wherein the coupling device comprises one of: a metal hook, and a carabiner.

15. The hanging cable mount system of claim 12:
    wherein the fastener comprises a u-bolt that is configured to extend through each of the first opening and the second opening; the plurality of nuts comprises a nut attached to each of a first leg and a second leg of the u-bolt adjacent the second body portion outside surface; and the coupling device comprises one of: a metal hook, and a carabiner; and
    including a fixed cable carrier at a first rail end, wherein the fixed cable carrier includes a cable clamp and is adjustably mounted to the overhead rail.

16. The hanging cable mount system of claim 12, including a fixed cable carrier at a first rail end, wherein the fixed cable carrier includes a cable clamp.

17. The hanging cable mount system of claim 16, wherein the fixed cable carrier is adjustably mounted to the overhead rail.

18. A cable holder element comprising:
    a first surface that includes a first channel defined therein, wherein the first channel has a substantially semi-circular cross section, extends from a first holder end to a second holder end of the holder element, includes a center section and two end sections, and is flat at the center section and convexly shaped at the two end sections;
    a second surface opposite the first surface that includes a second channel defined therein, wherein the second channel has a substantially rectangular cross section, extends from the first holder end to the second holder end, includes a center section and two end sections, and is flat at the center section and convexly shaped at the two end sections; and
    a first notch defined on the first surface in a direction perpendicular to the direction of the first channel and extending from one end of the holder element to an opposite end; and
    a second notch defined on the second surface in a direction perpendicular to the direction of the second channel and extending from one end of the holder element to an opposite end.

19. The cable holder element of claim 18, wherein:
    the first channel is convexly shaped in a longitudinal direction so as a depth of the first channel relative to the first surface is greater at the first holder end and the second holder end than at a first channel center section; and
    the second channel is convexly shaped in a longitudinal direction so as a depth of the second channel relative to the second surface is greater at the first holder end and the second holder end than at a second channel center section.

20. The cable holder element of claim 18, including an opening defined therein and extending from the first surface to the second surface.

* * * * *